US008366392B1

(12) United States Patent
Liang

(10) Patent No.: US 8,366,392 B1
(45) Date of Patent: Feb. 5, 2013

(54) COMPOSITE AIR COOLED TURBINE ROTOR BLADE

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 775 days.

(21) Appl. No.: 12/436,544

(22) Filed: May 6, 2009

(51) Int. Cl.

| | |
|---|---|
| ***B63H 1/14*** | (2006.01) |
| ***B63H 7/02*** | (2006.01) |
| ***B64C 11/00*** | (2006.01) |
| ***F01D 5/08*** | (2006.01) |
| ***F01D 5/18*** | (2006.01) |
| ***F03D 11/02*** | (2006.01) |
| ***F04D 29/58*** | (2006.01) |

(52) U.S. Cl. .................................... 416/97 R; 416/96 A

(58) Field of Classification Search ................ 416/96 A, 416/97 R
See application file for complete search history.

(56) References Cited

U.S. PATENT DOCUMENTS 5,002,460 A * 3/1991 Lee et al. .................... 416/96 A
5,392,515 A * 2/1995 Auxier et al. ............ 29/889.721

* cited by examiner

*Primary Examiner* — Fernando L Toledo
*Assistant Examiner* — Valerie N Brown
(74) *Attorney, Agent, or Firm* — John Ryznic

(57) ABSTRACT

A composite turbine rotor blade that uses the high heat resistance capability of a ceramic material along with the high strength capability of a high strength metallic material. A main body or insert piece with a leading edge, a trailing edge and a blade tip is made from a single piece of CMC, Carbon/Carbon or high temperature resistant metallic material such as Columbium or Molybdenum. A pressure side wall piece and a suction side wall piece both made of the metallic material that is bonded together to sandwich in-between the insert piece. The insert piece includes a number of cross-over holes in which locking pins pass through from one of the two metallic pieces and form bond surfaces to bond the two metallic pieces together with the insert piece sandwiched in-between. The two metallic pieces each include a serpentine flow cooling circuit to provide cooling air flow form the metallic pieces.

17 Claims, 7 Drawing Sheets

COMPOSITE AIR COOLED TURBINE ROTOR BLADE

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine rotor blade with near wall cooling.

2. Description of the Related Art including information disclosed under 37 CFR 1.97 and 1.98

A gas turbine engine, such as an industrial gas turbine (IGT) engine, includes a turbine with multiple rows or stages or stator vanes that guide a high temperature gas flow through adjacent rotors of rotor blades to produce mechanical power and drive a bypass fan, in the case of an aero engine, or an electric generator, in the case of an IGT. In both cases, the turbine is also used to drive the compressor.

The efficiency of the engine can be increased by passing a higher temperature gas flow into the turbine section. However, the highest temperature gas than can be passed into the turbine is limited to the material properties of the turbine, especially the first stage stator vanes and rotor blades since these airfoils are exposed to the highest temperature gas flow. To allow for temperatures high enough to melt these airfoils, complex airfoil internal cooling circuits have been proposed to provide convection, impingement and film cooling for the airfoils to allow even higher temperatures. However, the pressurized cooling air used for cooling of the airfoils is typically bled off from the compressor. The cooling air thus is not used for producing mechanical work but reduces the efficiency of the engine. it is therefore useful to also minimize the amount of cooling air used while at the same time maximizing the cooling capability of this minimized cooling air.

FIG. 1 shows a prior art first stage turbine rotor blade external heat transfer coefficient profile. As indicated by the graph, the airfoil leading edge, the airfoil suction side immediately downstream of the leading edge, as the airfoil trailing edge region experiences a higher hot gas side external heat transfer coefficient than the mid-chord section of the pressure side and downstream of the suction side surfaces. The heat load for the airfoil aft section is higher than the forward section. Also, due to a hot gas leakage cross flow effect, the blade tip section will also experience high heat load. Cooling of the blade leading edge, trailing edge and tip peripheral edge becomes the most difficult region for blade cooling designs. Without a good cooling circuit design, high cooling flow consumption is required for the blade edge cooling. As the TBC technology improves, more industrial gas turbine blades are applied with a relatively thick or low conductivity TBC. The cooling air flow demand will then be greatly reduced while allowing for higher turbine inlet temperatures. As a result, the cooling flow demand for these high heat load regions of the blade needs to be eliminated.

BRIEF SUMMARY OF THE INVENTION

It is an object of the present invention to provide for a turbine rotor blade with a low cooling air flow requirement that can operate under a higher temperature than the prior art investment cast turbine rotor blades.

It is another object of the present invention to provide for a turbine rotor blade with a lightweight blade design over the prior art turbine rotor blades.

It is another object of the present invention to provide for a turbine rotor blade in which the leading edge and the trailing edge do not require cooling.

These objectives and more can be achieved by the composite turbine rotor blade of the present invention which includes a separate edge piece with a leading edge, a trailing edge and a blade tip, and a pressure side metallic piece that forms the airfoil, the platform and the root for the pressure side of the composite blade and a suction side piece that forms the airfoil, the platform and the root for the suction side of the composite blade. The two metallic pieces are bonded together with the separate edge piece secured between the two metallic pieces to form the composite rotor blade. The separate edge piece can be made from a ceramic material, a composite material such as carbon-carbon, or a high temperature metallic material such as Columbium or Molybdenum.

The pressure side metallic piece includes a 3-pass near wall aft flowing serpentine flow cooling circuit formed therein to provide cooling for the pressure side of the blade. The suction side metallic piece includes a 5-pass near wall forward flowing serpentine flow cooling circuit formed therein to provide cooling for the suction side of the blade. The separate edge piece includes pressure side and suction side tip cooling holes that are connected to the respective serpentine flow cooling circuits to provide blade tip cooling air.

DETAILED DESCRIPTION OF THE INVENTION

Figure 1:
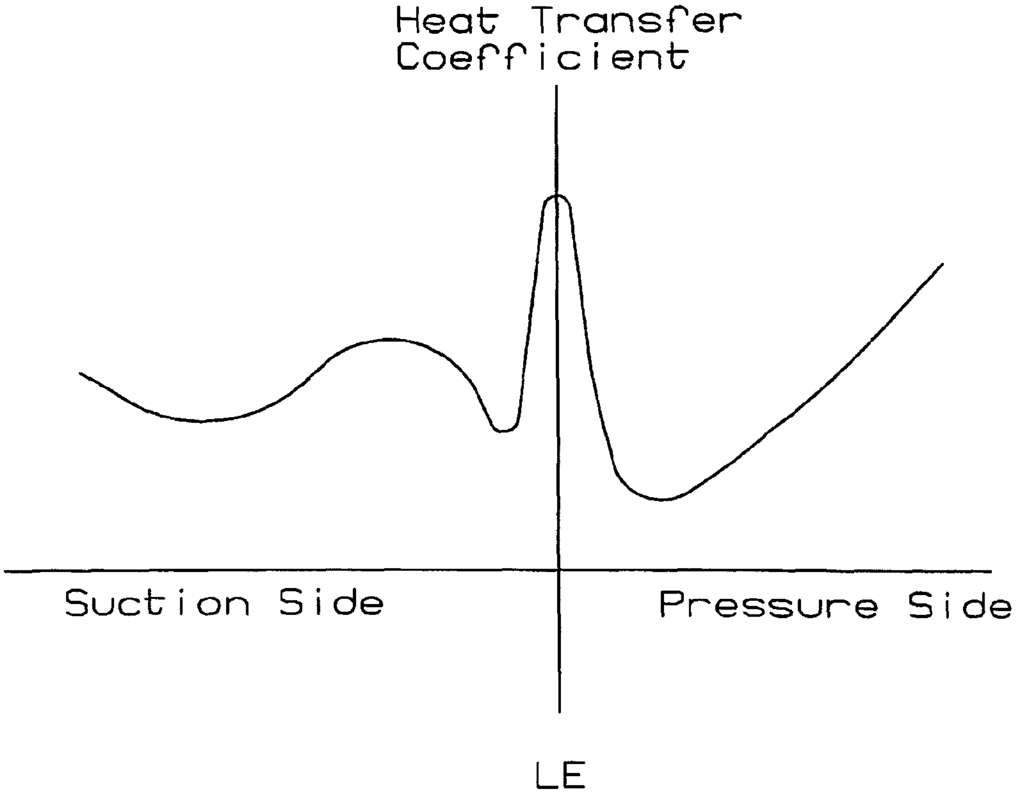
Fig 1 Prior Art
FIG. 1 shows a prior art first stage turbine rotor blade external heat transfer coefficient profile.
Figure 2:
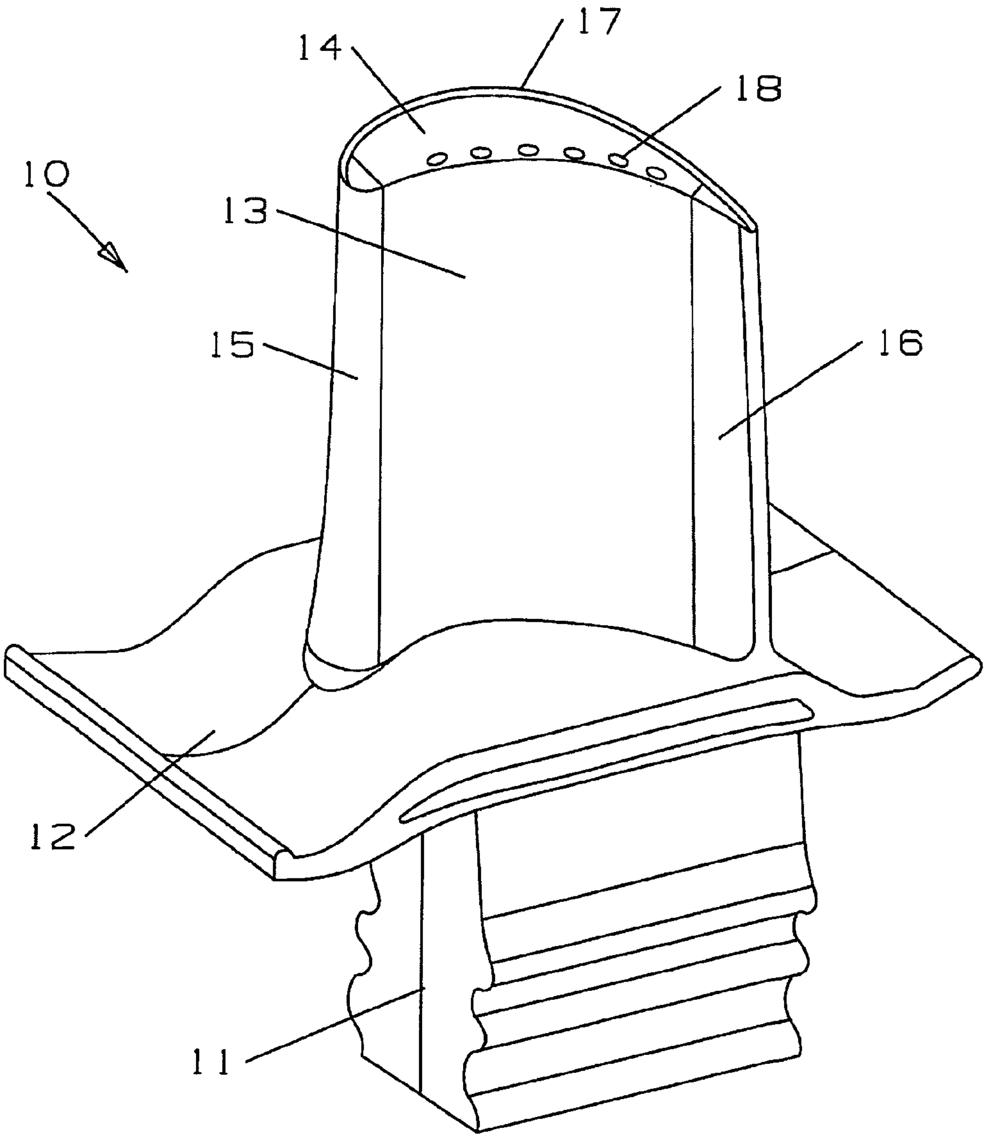
FIG. 2 shows a schematic view of the composite turbine rotor blade of the present invention.

The present invention is a turbine rotor blade for use in a gas turbine engine such as an industrial gas turbine engine for the first stage blades. However, the blade cooling circuit can be used for an aero engine blade as well. FIG. 2 shows the turbine rotor blade 10 of the present invention with a root 11, a platform 12 that forms a flow path for the hot gas flow passing through the turbine, and an airfoil extending from the platform that includes a leading edge 15 and a trailing edge 16 with a pressure side wall 13 and a suction side wall extending between the two edges. A blade tip 14 includes a single suction side tip rail 17 that extends from the trailing edge and around the leading edge and stops around the leading edge on the pressure side wall. A row of pressure side tip cooling slots 18 open onto the tip floor that connect the blade internal cooling air circuit. The tip cooling holes 18 extend along the pressure side edge of the tip from the leading edge ceramic piece 15 to the trailing edge ceramic piece 16.

The main feature of the turbine rotor blade 10 of the present invention is that the blade 10 is made from several pieces in which the leading edge, the trailing edge and the blade tip is made from a high temperature resistant ceramic material, or a composite material such as carbon-carbon, or a metallic material such as Columbium or Molybdenum, with the remaining sections of the blade being made from the investment cast metallic materials. The metallic part of the blade includes a pressure side piece and a suction side piece that are bonded together with the separate edge piece secured between the two metallic pieces. The two metallic pieces form a structural support for the separate edge piece. FIG. 2 shows a pressure side metallic piece with a root section, a platform section and the pressure side airfoil piece with a suction side metallic piece having a similar shaped root section, platform section and the suction side airfoil piece (not seen in FIG. 2) that together form the complete blade.

Figure 3:
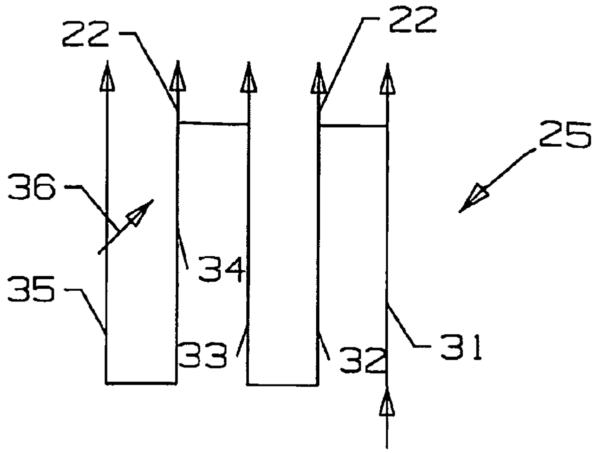
FIG. 3 shows a flow diagram of the blade cooling circuit along the suction side wall of the rotor blade of the present invention.
Figure 4:
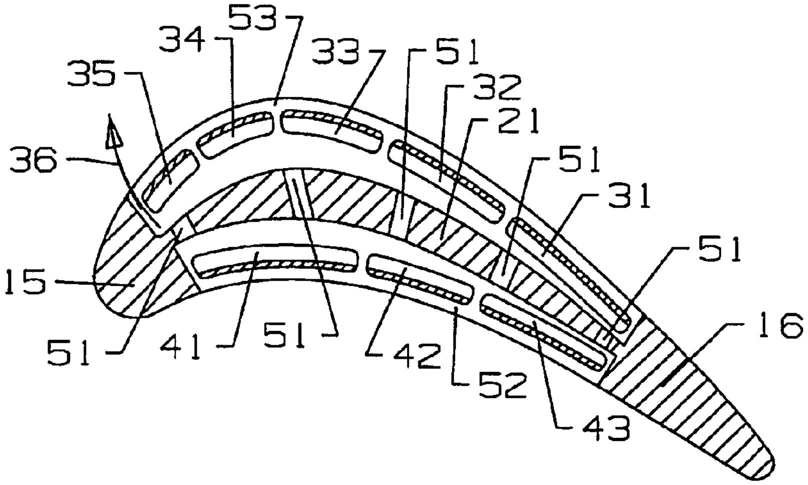
FIG. 4 shows a cross section view along the spanwise direction of the blade of the blade internal cooling circuit of the present invention.
Figure 5:
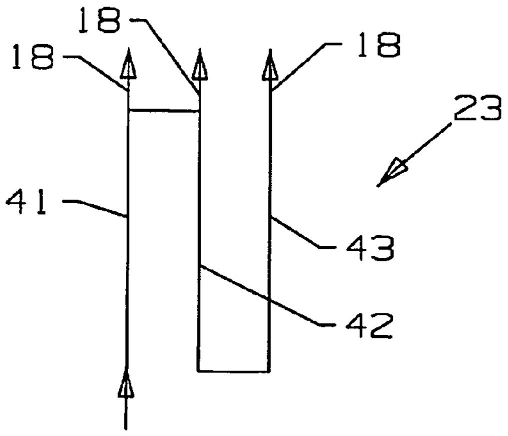
FIG. 5 shows a flow diagram of the blade cooling circuit along the pressure side wall of the rotor blade of the present invention.

FIG. 4 shows the internal cooling circuit for the blade 10 with the composite material leading edge 15 and trailing edge 16. The two metallic pieces that form the pressure side airfoil and the suction side airfoil are made from a metallic material such as nickel based super-alloys that are formed by an investment casting process. The suction side piece 53 includes a 5-pass forward flowing serpentine cooling flow circuit 25 as represented by the flow diagram in FIG. 3. The pressure side piece 52 includes a 3-pass aft flowing serpentine cooling flow circuit 23 as represented by the flow diagram in FIG. 5. The suction side piece 53 and the pressure side piece 52 are formed using the investment casting process with the serpentine flow circuits and any trip strips or other heat transfer enhancing features formed within the casting process.

Figure 9:
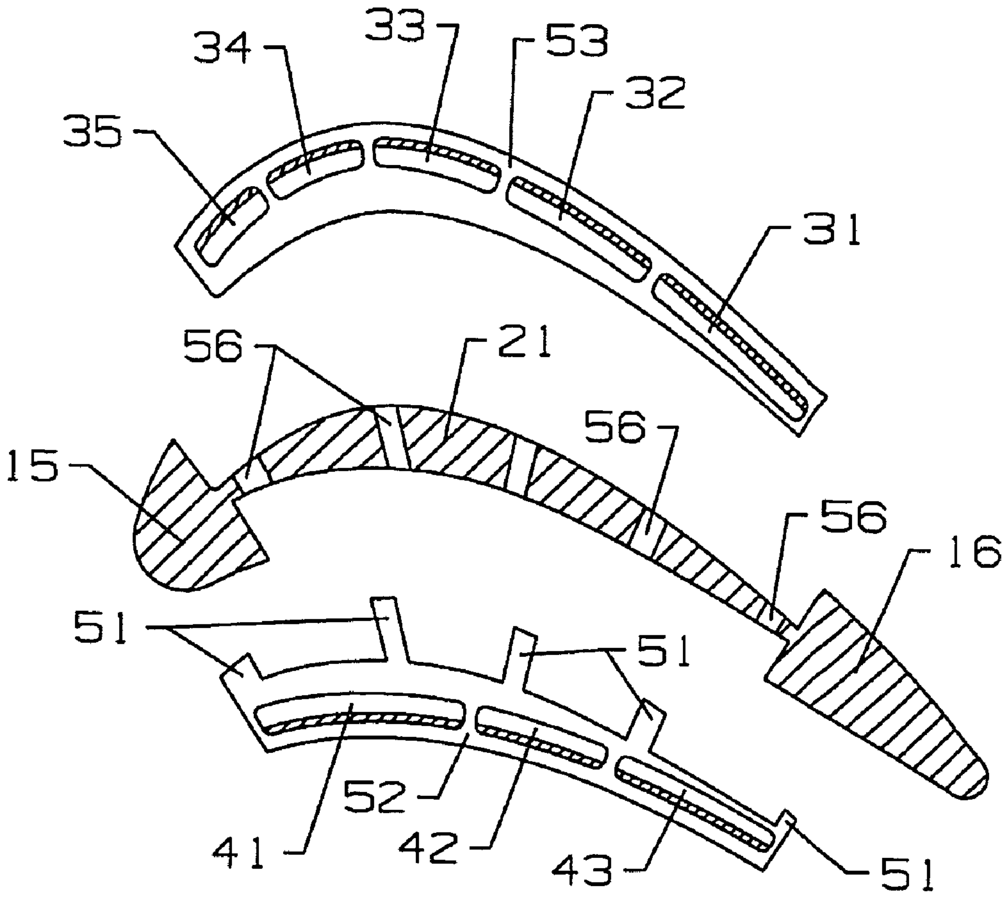
FIG. 9 shows an exploded view of the composite blade assembly in its various pieces.

The pressure side piece 52 includes several rows of locking pins 51 that are aligned with cross-over holes 56 formed in the ceramic piece. The suction side piece will bond to flat end surfaces of the locking pins 51 with the ceramic piece positioned between the two metallic pieces to form the composite blade 10. A transient liquid phase (TLP) bonding process can be used to secure the two metallic pieces together. FIG. 9 shows the three pieces of the composite blade is an unassembled state with the ceramic piece having the leading edge 15 and the trailing edge 16 with an insert piece or separate edge piece 21 extending between the two edges 15 and 16. The cross-over holes 56 are formed in the ceramic piece to receive the locking pins 51 of the pressure side metallic piece. The pressure side metallic piece includes the locking pins 51 and forms the pressure side airfoil with the 3-pass serpentine flow cooling circuit. The serpentine flow circuit on the pressure side metallic piece can be other types of cooling circuit besides serpentine flow circuits, or can be serpentine flow circuits other than the 3-pass serpentine circuit shown in the present invention. Also, the locking pins 51 can extend from the suction side metallic piece instead of the pressure side metallic piece. The suction side metallic piece forms the suction side airfoil with the 5-pass serpentine flow cooling circuit. The cooling flow circuit on the suction side metallic piece can be other types of cooling circuit besides serpentine flow circuit or the 5-pass serpentine flow circuit as shown in the present invention.

Figure 6:
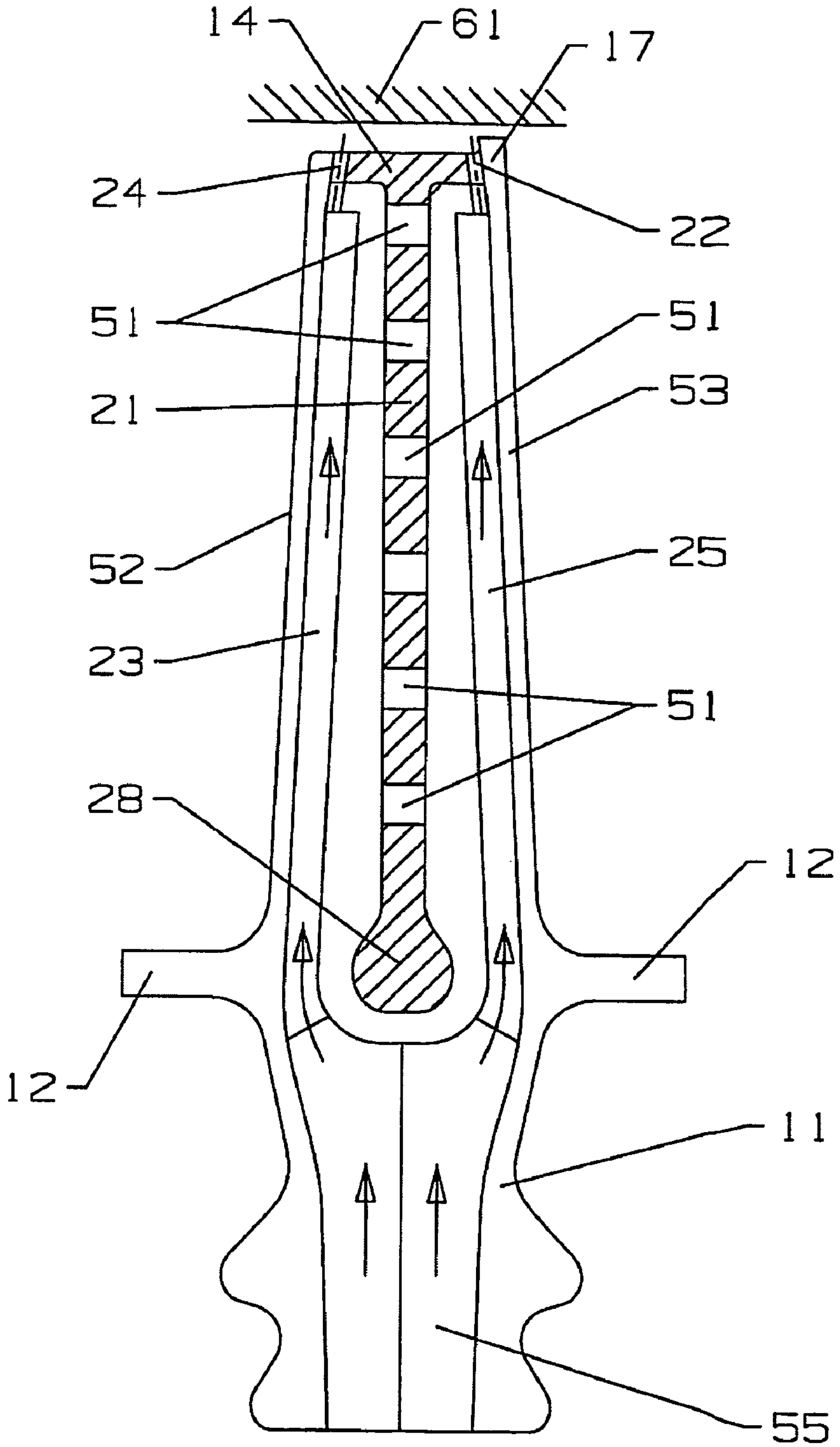
FIG. 6 shows a cross section rear view of the rotor blade cooling circuit of the present invention.

The 5-pass serpentine flow circuit 25 is located along the suction side wall of the insert piece or separate edge piece 21 of the blade and includes a first leg 31 located along the trailing edge region adjacent to the composite trailing edge 16 of the blade 10, with a second leg 32, third leg 33, fourth leg 34 and fifth leg 35 extending in series along the suction side wall. The fifth leg 35 is located adjacent to the composite leading edge 15. A row of suction side wall film cooling slots 36 is formed between the insert piece or separate edge piece 21 and the composite leading edge 15. The row of film cooling slots 36 is connected to the fifth leg 35 to discharge a layer of film cooling air onto the suction side wall surface. Tip rail cooling holes 22 are connected to the 5-pass serpentine circuit 25 and discharge cooling air along the forward side of the tip rail as seen in FIG. 6. Trip strips are located along the passages of the serpentine flow circuits to promote heat transfer from the hot metal surface to the cooling air flowing through the channels.

The pressure side wall of the blade is cooled with the 3-pass serpentine flow cooling circuit 23 that includes a first leg 41 located adjacent to the composite leading edge 15, then a second leg 42 and a third leg 43, where the third leg 43 is located adjacent to the composite trailing edge 16. The blade tip cooling holes 18 are connected to the 3-pass serpentine circuit 23. Tip strips are located along the passages of the serpentine flow circuits to promote heat transfer from the hot metal surface to the cooling air flowing through the channels.

The pressure side wall 52 and the suction side wall 53 are both thin walls that are bonded to the insert piece or separate edge piece 21 of the blade 10. A number of locking pins 51 are built into the back side of an inner wall for bonding to the suction side metal piece and locking the composite insert material to the blade assembly 10. Metering holes are formed in the serpentine flow channel tip turns as well as the ends of the serpentine flow channels to discharge any remaining cooling air flow to provide both cooling and sealing to the blade tip to control blade tip leakage flow across the BOAS 61.

FIG. 6 shows a cross section view the blade 10 from the trailing edge side to show the cooling circuit. The blade includes a cooling air supply channel 55 formed in the blade root 11 that is connected to an external source of pressurized cooling air. The pressure side wall 52 forms the 3-pass serpentine flow circuit with the insert or separate edge piece 21 and the suction side wall 53 forms 5-pass serpentine flow circuit also with the insert piece or separate edge piece 21. The pressure side wall 52 and the suction side wall 53 are both formed as thin walls so that the heat transfer rate is high and the metal temperature is lower than normal for a relatively thick wall airfoil such as those found from the investment cast airfoils. Both the pressure side 3-pass serpentine flow circuit and the suction side 5-pass serpentine flow circuit are connected to the cooling air supply channel 55. The tip cooling holes 24 are connected to the 3-pass serpentine flow circuit while the tip rail cooling holes 22 are connected to the 5-pass serpentine flow circuit. the tip rail cooling holes 22 extend through the blade tip and open onto the tip surface adjacent to the upstream or forward surface of the suction side tip rail 17 in which the hole axis is substantially parallel to the inner surface of the tip rail as seen in FIG. 6. FIG. 6 shows a series of locking pins 51 extending through the cross-over holes formed in the insert piece 21. The insert piece 21 includes a dovetail 28 formed on a lower end with the tip 14 also formed as part of the insert piece 21. The dovetail 28 extends along the entire bottom end of the ceramic piece and is sandwiched in-between the two metallic pieces within dovetail shaped grooves formed in these two pieces. When the two metallic pieces are bonded together with the ceramic piece sandwiched in-between, the dovetail 28 is secured within the grooves of the two metallic pieces. The locking pins 51 and the dovetail 28 all form structure to secure the ceramic piece against radial displacement with respect to the two metallic pieces. The blade tip 14 forms a seal with a BOAS 61 as seen in FIG. 6.

Figure 7:
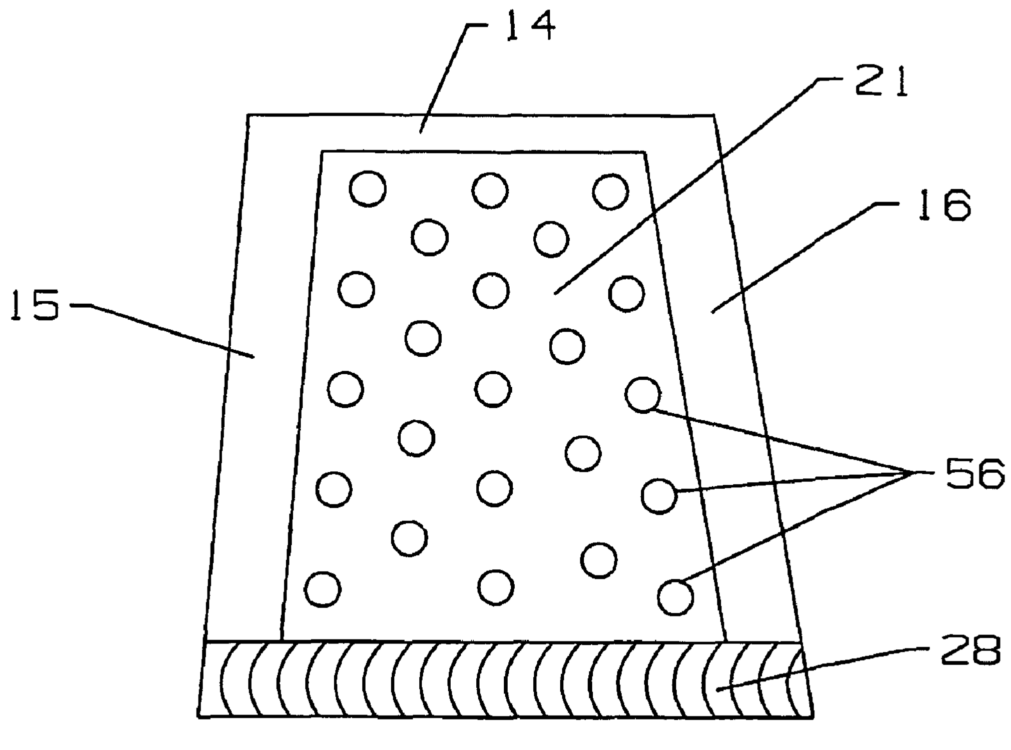
FIG. 7 shows a cross section side view of a composite edge piece used in the rotor blade of the present invention.

FIG. 7 shows a frontal view of the insert piece 21 which includes a leading edge piece 15, a trailing edge piece 16, a tip cap 14, the dovetail 28 on the lower end opposite from the tip 14, and a number of cross-over holes 56 that are used to receive the locking pins 51 and bond the two metallic pieces together with the insert piece 21 secured or sandwiched in-between them. The locking pins 51 also provide a large surface area in which the relatively low strength ceramic piece is restrained from radial displacement during rotation of the blade in an engine. The insert piece 21 can be formed from a single piece using the well known composite material casting process.

Figure 8:
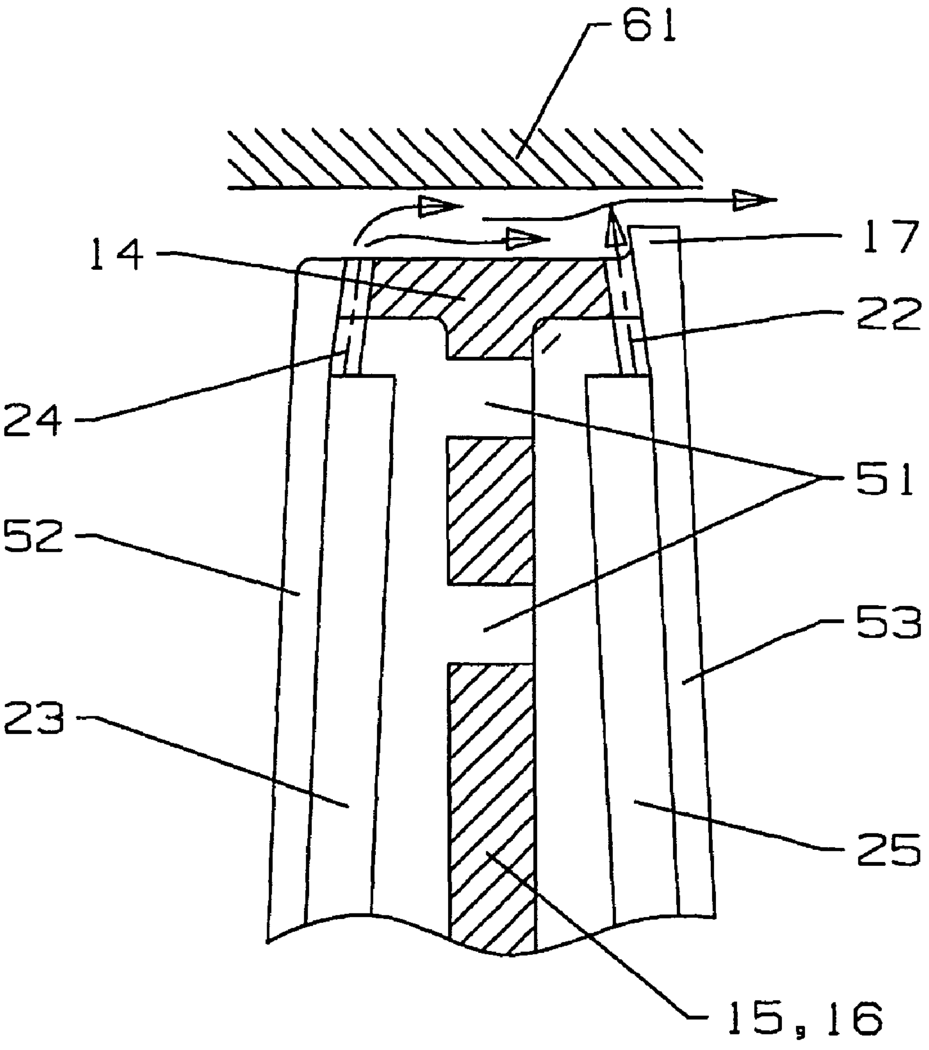
FIG. 8 shows a detailed cross section view of the blade tip cooling and sealing circuit for the turbine rotor blade of the present invention.

FIG. 8 shows a detailed view of the blade tip section cooling and sealing arrangement. The ceramic piece includes the tip section 14 of the blade that extends from the leading edge part 15 to the trailing edge part 16. The tip ends of the two metallic pieces that form the pressure side wall and suction side wall have inner surfaces with a chamfer that slant inward and form the tip cooling holes 24 and 22 with the ceramic tip section 14. The pressure side tip cooling holes 24 are connected to the serpentine flow circuit on the pressure side wall to discharge cooling air onto the blade tip 14. The suction side tip cooling holes 22 are formed along an inner side of a tip rail 17 that extends along the entire suction side periphery and around the leading edge of the blade tip. The suction side tip cooling holes 22 are connected to the serpentine flow circuit on the suction side wall. When the pressure side wall metallic piece is assembled into place with the locking pins 51 abutting the suction side wall metallic piece, the two metallic pieces abut against the pressure and suction sides of the ceramic blade tip 14 to form a tight fit and define the tip cooling holes 24 and 22. The chamfer or inward slant of the blade tip pressure side edge and suction side edge abuts against the inner side surfaces of the pressure side wall and the suction side wall to better secure the insert piece between the two side wall pieces. The pressure side cooling holes 24 and the suction side tip rail cooling holes 22 are also formed with the same chamfer or inward slant such that the pressure side film hole 24 will discharge the cooling air with a slight downstream flow direction.

To bond the two metallic pieces together, a transient liquid phase (TLP) bonding process is used. The cooling flow circuit contains in the pressure side and suction side pieces are cast within each individual single piece. These two piece metal spars are then bonded together with the composite edge piece to form the complete blade assembly 10 with the platform and the root. Major design features and advantages of the cooling circuit for the composite blade over the prior art near wall cooled blade designs are described below.

Low total cooling flow consumption due to a high temperature composite material is used for the blade leading edge and trailing edge. No cooling is required for all edges. The use of carbon-carbon high temperature resistant material on the airfoil edge sections reduces the hot gas side convection surface that needs to be cooled. The use of near wall cooling technique for the blade mid-chord section yields a very high cooling effectiveness and thus reduces the blade cooling flow requirement. The composite blade construction design yields a lightweight blade which allows for the turbine to be designed at much higher $AN^2$. High density of tip cooling holes is used in the tip rail for sealing of the blade against blade tip leakage. The 2-piece near wall serpentine blade cooling design sub-divides the blade into two separate pieces that includes the blade pressure side section and the blade suction side section. Each individual cooling section can be independently designed based on the local heat load and aerodynamic pressure loading conditions. The pressure side serpentine circuit flows first in the leading edge region of the airfoil and ends at the trailing edge side, and thus lowers the required cooling supply pressure and reduces the overall blade leakage flow. The pressure side flow circuit is separated from the suction side flow circuit and thus eliminates the blade mid-chord cooling flow mal-distribution that occurs in the prior art blades. The pressure side flow circuit is separated from the suction side flow circuit and thus eliminates the design issues associated with the back flow margin (BFM) and high blowing ratio for the blade suction side film cooling holes. The blade is subdivided into two different zones to increase the design flexibility to redistribute the cooling flow and/or add cooling flow for each zone and thus increase the growth potential for the cooling circuit design.

The composite turbine rotor blade of the present invention is a composite blade in that the blade is formed from an insert piece 21 that includes the leading edge and the trailing edge and the blade tip structure with the pressure side wall 52 and the suction side wall 53 bonded together such that the separate edge piece is sandwiched in-between the two side wall pieces. In the composite blade, the insert piece 21 can be made from a ceramic material such as carbon matrix composite, or from a composite material such as carbon/carbon, or from a metallic material such as Columbium or Molybdenum. The two side wall pieces 52 and 53 can be made from a high temperature metallic material in which the serpentine flow cooling circuits can be formed using the investment casting process.

I claim the following:

1. A composite turbine rotor blade comprising:

an insert piece having a forward side forming a leading edge of the blade, a top end forming a blade tip for the blade, and a rear side forming a trailing edge for the blade, and a lower end having a dovetail shape, the insert piece being a single piece;

a pressure side piece forming a pressure side wall for the blade with a pressure side wall cooling circuit formed within the pressure side piece;

a suction side piece forming a suction side wall for the blade with a suction side wall cooling circuit formed within the suction side piece;

the insert piece having a main body section with a plurality of cross-over holes;

the pressure side piece or the suction side piece having a plurality of locking pins aligned with the cross-over holes; and, the pressure side piece and the suction side piece being bonded together through the locking pins with the insert piece sandwiched in-between the pressure side piece and the suction side piece to form the composite blade.

2. The composite turbine rotor blade of claim 1, and further comprising:

the cooling circuit for the pressure side wall and the suction side wall includes a serpentine flow cooling circuit extending along the side wall from a platform to the blade tip.

3. The composite turbine rotor blade of claim 2, and further comprising:

the cooling circuit for the pressure side wall is a 3-pass serpentine flow cooling circuit; and, the cooling circuit for the suction side wall is a 5-pass serpentine flow cooling circuit.

4. The composite turbine rotor blade of claim 1, and further comprising:

the pressure side piece and the suction side piece are both made of a high temperature resistant metallic material.

5. The composite turbine rotor blade of claim 1, and further comprising:

the pressure side piece and the suction side piece together from a platform section and a root section for the composite blade when the two pieces are bonded together.

6. The composite turbine rotor blade of claim 1, and further comprising:

the pressure side piece and the suction side piece sandwich the dovetail of the insert piece when the two pieces are bonded together to prevent radial displacement of the insert piece from the composite blade.

7. The composite turbine rotor blade of claim 1, and further comprising:

the pressure side piece and the pressure side edge of the blade tip form a row of pressure side wall tip cooling holes connected to the pressure side wall piece cooling circuit.

8. The composite turbine rotor blade of claim 1, and further comprising:

the suction side piece and the suction side edge of the blade tip form a row of suction side wall tip cooling holes connected to the suction side wall piece cooling circuit.

9. The composite turbine rotor blade of claim 1, and further comprising:

the blade tip includes a suction side tip rail that extends from a trailing edge and wraps around the leading edge; and, the pressure side wall is without a pressure side tip rail.

10. The composite turbine rotor blade of claim 2, and further comprising:

the serpentine flow cooling circuit channels include trip strips on the outer wall surfaces.

11. The composite turbine rotor blade of claim 1, and further comprising:

the leading edge and the trailing edge of the composite blade is without film cooling holes.

12. The composite turbine rotor blade of claim 1, and further comprising:

the insert piece is formed from a ceramic matrix composite or a carbon/carbon composite material, or Columbium, or Molybdenum.

13. The composite turbine rotor blade of claim 1, and further comprising:

the pressure side wall piece and the suction side wall piece are both made from a high temperature metallic material that can be formed using an investment casting process.

14. The composite turbine rotor blade of claim 1, and further comprising:

the tip section of the insert piece includes a pressure side edge and a suction side edge with both edges slanting inward toward a center of the blade tip; and, the pressure side wall piece and the suction side wall piece both include an inner side surface that has the same slant as the tip section such that the tip section is secured between the two side wall pieces.

15. The composite turbine rotor blade of claim 1, and further comprising:

the slanted surfaces of the pressure side piece and the suction side piece and the blade tip piece form a row of pressure side tip cooling holes and suction side tip rail cooling holes.

16. A composite turbine rotor blade comprising:

an insert piece with a leading edge region and a trailing edge region of the blade;

the insert piece being formed from a single piece and without any cooling air passages;

a pressure side wall piece secured to a pressure side surface of the insert piece;

the pressure side wall piece having a cooling air circuit formed therein;

a suction side wall piece secured to a suction side surface of the insert piece; and, the suction side wall piece having a cooling air circuit formed therein.

17. A composite turbine rotor blade comprising:

an insert piece with a leading edge region and a trailing edge region of the blade;

the insert piece forming a blade tip on one end and having an enlarged portion on the opposite end;

a pressure side wall piece having a pressure side platform and a pressure side root section;

a suction side wall piece having a suction side platform and a suction side root section; and, the insert piece being secured within the pressure side wall piece and the suction side wall piece to form the composite turbine rotor blade.

* * * * *